(12) United States Patent
Katahira (10) Patent No.: US 6,667,811 B1
(45) Date of Patent: Dec. 23, 2003

(54) IMAGE FORMING APPARATUS

(75) Inventor: Shunsuke Katahira, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/261,125

(22) Filed: Mar. 3, 1999

(30) Foreign Application Priority Data

Apr. 10, 1998 (JP) .......................................... 10-099033

(51) Int. Cl.⁷ ...................... G06F 15/00; G06F 15/167; G09G 5/00; G06T 1/60; G06T 9/00
(52) U.S. Cl. .................. 358/1.14; 358/1.14; 358/1.16; 345/828; 345/530; 345/531; 345/541; 345/553; 345/555; 345/771
(58) Field of Search .............................. 358/1.14, 1.16; 345/828, 530, 531, 541, 553, 771, 555

(56) References Cited

U.S. PATENT DOCUMENTS

| | | | | |
|---|---|---|---|---|
| 4,343,036 A | * | 8/1982 | Shimizu et al. ............. | 345/418 |
| 4,530,063 A | * | 7/1985 | Masuda et al. ............. | 358/1.12 |
| 5,168,307 A | * | 12/1992 | Masuda et al. ............. | 355/57 |
| 5,369,768 A | * | 11/1994 | Takano ....................... | 710/264 |

FOREIGN PATENT DOCUMENTS

JP          5-167762          7/1993

* cited by examiner

*Primary Examiner*—Edward Coles
*Assistant Examiner*—Monica Mitchell
(74) *Attorney, Agent, or Firm*—Foley & Lardner (57) ABSTRACT

An image forming apparatus, which reads an image of a document and forms the same image, including a display, a input means to be receive an input data, a ROM to store initial display data of the input means and compressed programs, a power source detecting circuit to detect that the power is ON and a CPU to read initial display data of the input means stored in a ROM and control the display of initial display data on the display of the control panel.

5 Claims, 7 Drawing Sheets

IMAGE FORMING APPARATUS

BACKGROUND OF THE INVENTION

1. Field of the Invention

The present invention relates to an image forming apparatus such as a digital plain paper copier, etc. which reads a document image by scanning a document and forms a reproduced image corresponding to the read document image on a paper.

2. Description of the Related Art

On a digital plain paper copier (DPPC) as an image forming apparatus, a program is compressed and stored in a mounted ROM in order to reduce its capacity. In case of a digital plain paper copier, after the power source is turned ON, a program is first expanded and then, executed and the copier is operated.

On an image forming apparatus which compresses a program in order to reduce its capacity, the program that was compressed and stored in a ROM or a hard disc was so far expanded using a boot program that is for starting up a computer incorporated in the image forming apparatus and was then stored in a RAM. In this case, the display on the control panel to make the input is made by a program stored in the RAM. Therefore, if a program was large, a time was required for the expansion of it and user had to wait until the indication was presented on the control panel and tended to misconceive that the power source is not properly turned ON.

That is, on a conventional digital plan paper copier, a CPU reads a compressed program out of a ROM when the power source is turned ON. After expanding the compressed program read out of the ROM, the CPU stores the expanded program in the RAM. When expanded programs are all stored in the RAM, the CPU starts to execute the expanded program on the RAM and executes a program to transfer display data to the display of the control panel. When the program to transfer the display data is executed, the data is displayed on the display of the control panel.

Further, if it is necessary to check that a specific key is pressed by an operator when the power source is ON, a conventional digital plain paper copier had such a problem that the operator must continuously push the key until the expanded program starts to operate.

As mentioned above, when the power source is ON, the digital copier discriminates whether it is the normal power ON or it is turned ON by an operator for making the adjustment and changes subsequent processes accordingly. For instance, if a specific key is pushed when the power source is ON, an adjustment program for operator is started. If no key is pushed, it is regarded to be a normal start.

That is, on a conventional digital copier, when the power source is turned ON and a reset signal is input, a CPU reads a compressed program from a ROM. Then, after expanding the program, the CPU stores the expanded program in a RAM.

When all programs are expanded and stored in the RAM, the CPU starts the operation according to the expanded programs and starts to execute an analyzing program of the control panel. The CPU checks if a key of the control panel is pushed and when it is pushed, makes the display for an operator on the display of the control panel and starts the operation for operator.

Further, if the control panel key is not pushed, the CPU displays the normal screen on the display of the control panel and starts the normal operation.

As mentioned above, a conventional digital copier had such problems that a time was required until the display appeared on the display of the control panel or a time was needed until the check to see whether the control panel key was pushed when the power source was ON. In particular, when detecting that the control panel key was pushed when the power source was ON, there was such a defect that a key had to be kept pushed until the program expanding was completed, the expanded program was started and the control program analyzing program was started.

As mentioned above, on an image forming apparatus which compresses a program and stores it in a ROM in order to reduce its capacity, a program that was compressed and stored in a ROM or a hard disk by a boot program that is to be first executed when the power source is turned ON is expanded and stored in a RAM. However, if a program is in a large, a time is required to expand it and therefore, user had to wait until the display appears on the display of the control panel. Moreover, there was such a problem that user is apt to misunderstand that the power source is not properly turned ON and further, when it is necessary to check if a specific key is pushed when the power source is turned ON, user must push a key continuously until an expanded program begins to operate.

SUMMARY OF THE INVENTION

It is an object of the present invention to provide an image forming apparatus which makes a quick display on the display portion of a control panel without requiring to continuously push a specific key when the power source is ON and programs are compressed and stored in a ROM.

According to the present invention, an image forming apparatus configured to form an image by reading an image on a document, comprising a control panel having a display configured to receive an input data, a memory configured to store an initial display data of the control panel and a compressed program, a power source detector configured to detect that the power source is turned ON, and a controller configured to control the initial display made on the display of the control panel by reading initial display data of the control panel stored in the memory when the power ON is detected by the detector.

DETAILED DESCRIPTION OF THE PREFERRED EMBODIMENT

Hereinafter, a preferred embodiment of the present invention will be described referring to the attached drawings.

Figure 1:
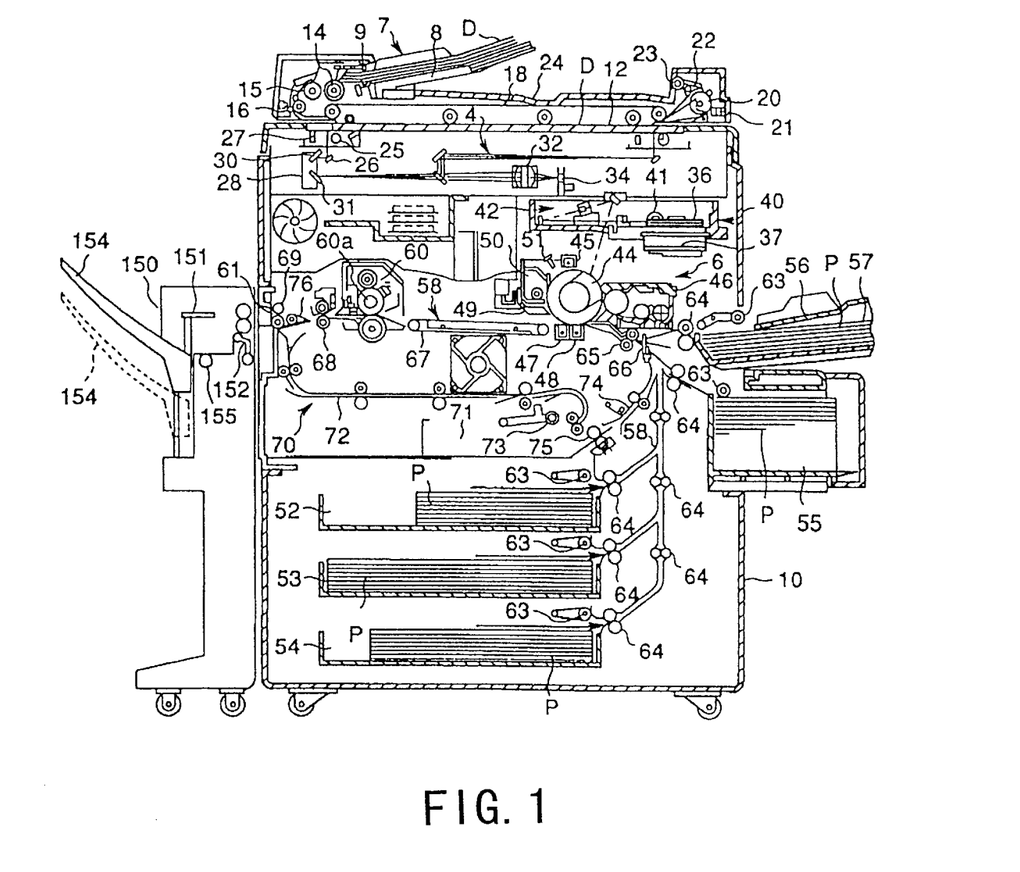
FIG. 1 a schematic diagram showing the construction of a digital plain paper copier relative to an image forming apparatus of the present invention.

FIG. 1 is a schematic sectional view showing the internal construction of a digital plain paper copier relative to an image forming apparatus of the present invention.

As shown in FIG. 1, a scanner portion 4 that functions as an image reader and a printer portion 6 that functions as an image forming means are provided in a main body 10.

On the top of the main body 10, there is provided a document table 12 made of a transparent glass on which an original document D is placed. Further, on the top of the main body, there is also provided an automatic document feeder 7 (hereinafter referred to as ADF) that feeds a document automatically on the document table 12. The ADF 7 is provided so that it can be opened/closed to the document table 12 and also functions as a document retainer to keep an original document D placed on the document table 12 closely fitted thereto.

The ADF 7 has a document feed tray 8 on which a document is set, an empty sensor 9 to detect presence of a document, a pick-up roller 14 to pick up a document one by one from the document feed tray 8, a document feed roller 15 to convey the picked up document, an aligning roller pair 16 to align the leading edge of a document and a conveyor belt 18 arranged so as to cover almost the entire document table 12. Plural sheets of an original document that are set upward in the document feed tray 8 is taken out in order from the lowest page, that is, the last page and after aligned by the aligning roller pair 16, is conveyed to a specified position of the document table 12.

In the ADF 7, the aligning roller pair 16 is provided at one side and at the end of the opposite side with the conveyor belt 18 between, there are a reversing roller 20, a discharged document sensor 21, a flapper 22 and an exit roller 23. An original document D of which image data is read by the scanner portion 4 that is described later is sent out of the document table 12 by the conveyor belt 18 and discharged on a document receiving tray 24. To read an image on the reverse side of a document D that has images on both sides, the document D conveyed by the conveyor belt 18 is reversed by the reversing roller 20 and then, conveyed to the specified position on the document table 12.

The scanner portion 4 provided in the main body 10 has an exposure lamp 25 as a light source to illuminate the document D placed on the document table 12 and a first mirror 26 to deflect the reflecting light from the document D. These exposure lamp 25 and the first mirror 26 are mounted to a first carriage 27 provided below the document table 12.

The first carriage 27 is arranged to be able to move in parallel with the document table 12 and is reciprocated under the document table 12 by a scanner driving motor (not shown) that is described later via a toothed belt, etc.

Under the document table 12, there is provided a second carriage 28 that is able to move in parallel with the document table 12. A second and a third mirrors 30 and 31 are mounted to the second carriage 28 at the right angle to each other to deflect the reflected light from the document D that is deflected by the first mirror 26. The second carriage 28 is driven to the first carriage 27 by the toothed belt, etc. that drive the first carriage 27 and is moved to the first carriage along the document table 12 in parallel with it at a ½ speed.

Under the document table 12, there are provided a lens 32 to focus the reflected light from the third mirror 31 on the second carriage and a CCD 34 that receives the reflected light focused by the lens and makes the photoelectric conversion. The lens 32 is provided in the surface including the optical axis of the light deflected by the third mirror 31 and is movable via a driving mechanism and focuses the reflected light at a desired magnification by moving itself. The CCD 34 makes the photoelectric conversion of the incident reflected light and outputs an electric signal corresponding to the read document D.

On the other hand, the printer portion 6 is provided with a laser used exposure device 40 that acts as an electrostatic latent image forming means. This laser used exposure device 40 is provided with a semiconductor laser 41 as a light source, a polygon mirror 36 as a scanning member to continuously deflect the laser beam emitted from the semiconductor laser 41, a polygon mirror driving device 37 as a scanning moor to drive the polygon mirror at a specified number of rotations that is described later and all optical system to deflect the laser beam from the polygon mirror and lead to a photo-conductive drum 44 that is described later. The laser used exposure device 40 in the structure as described above is fixed to and supported by the supporting frame (not shown) of the main body 10.

The semiconductor laser 41 is turned ON/OFF corresponding to image data read by the scanner portion 4 or document/data, etc. received/sent through a FAX, etc., the above-mentioned laser beam is directed to the photo-conductive drum 44 via the polygon mirror 36 and the optical system 42 and forms an electrostatic latent image on the photo-conductive drum 44 by scanning the outer surface of the photo-conductive drum 44.

Further, the printer portion 6 has the rotary photo-conductive drum 44 that is provided as an image carrier at nearly the center of the main body 10, the outer surface of the photo-conductive drum 44 is exposed by the laser beam emitted from the laser used exposure device 40 and a desired electrostatic latent image is formed thereon. Around the photo-conductive drum 44, there are a main charger 45 to charge the outer surface of the drum to a specified level, a developing device 46 to feed a toner as a developer to an electrostatic image formed on the outer surface of the photo-conductive drum 44 to develop it at a desired image density, and a separation charger 47 to separate an image receiving medium, that is, a copy paper P from the photo-conductive drum 44 in one united body. Further, there are arranged a transferring charger 48 to transfer a toner image formed on the photo-conductive drum 44 on a paper P, a separation claw 49 to separate a copy paper P from the outer surface of the photo-conductive drum 44, a cleaner 50 to clean the toner left on the outer surface of the photo-conductive drum 44 and a charge eliminator 51 to eliminate the charge on the outer surface of the photo-conductive drum 44 in order.

At the lower part in the main body 10, an upper cassette, a middle cassette and a lower cassette that can be pulled out of the main body are arranged in the mutually stacked state. Copy paper in different size is filled in each cassette. A large capacity paper feeder 55 is provided at the side of these cassettes. The large capacity paper feeder 55 contains about 3,000 sheets of A4 size copy paper P. Above the large capacity paper feeder 55, a paper cassette 57 is provided in the detachable state. This paper cassette 57 also serves as a manual paper feed tray 56.

In the main body 10, a conveying path 58 is formed extending from each of the cassettes and the large capacity paper feeder 55 through the transferring portion located between the photo-conductive drum 44 and the transferring charger 48. At the end of the conveying path 58, a fixing device 60 that has a fixing lamp 60a is provided. At the side wall of the main body 10 facing to the fixing device 60, an exit port 61 is formed. A single tray finisher 150 is mounted to this exit port 61.

A pick-up roller 63 is provided near the upper cassette 52, the middle cassette 53, the lower cassette 54, the paper cassette 57 and the large capacity paper feeder 55 to pick up a copy paper P one by one from the cassettes and the large capacity paper feeder, respectively. Further, many of a paper feed roller pair 64 are provided to the conveying path 58 to convey the copy paper P taken out by the pick-up roller 63.

In the conveying path 58, an aligning roller pair 65 is provided at the upper stream side of the photo-conductive drum 44. The aligning roller pair 65 corrects the tilt of a picked up copy paper P, aligns the top of a toner image on the photo-conductive drum 44 with the leading edge of a copy paper P and feeds the copy paper P to the transferring portion at the same speed as the moving speed of the outer surface of the photo-conductive drum 44. At this side of the aligning roller pair 65, that is, the paper feed roller pair 64 side, a sensor 66 is provided to detect the arrival of the copy paper P.

Copy paper P picked up from each cassette or the large capacity paper feeder 55 one by one by the pick-up roller 63 is conveyed to the aligning roller pair 65 by the paper feed roller pair 64. Then, the copy paper P is conveyed to the transferring portion after its leading edge is aligned by the aligning roller pair 65.

In the transferring portion, a developer image, that is, a toner image formed on the photo-conductive drum 44 is transferred on a paper P by the transferring charger 48. The copy paper P that has a transferred toner image is separated from the outer surface of the photo-conductive drum 44 by the actions of the separation charger 47 and the separation claw 49 and conveyed to the fixing device 60 by way of the conveyor belt 67 that is a part of the conveying path 52. Then, after the developer image is fused and fixed on the copy paper P by the fixing device 60 is discharged on the finisher 150 through the exit port 61 by a paper feed roller pair 68 and a paper discharge roller pair 69.

Under the conveying path 58, there is provided an automatic duplex device 70 to feed the copy paper P passed through the fixing device 60 again to the aligning roller pair 65 by reversing it. The automatic duplex device 70 is equipped with a temporary stacker 71 to stack copy paper P temporarily, a reversing path 72 to lead the copy paper P branched and passed through the fixing device 69 after reversing it, a pick-up roller 73 to take out the copy paper P stacked in the temporary stacker by one sheet at a time and a paper feed roller pair 75 to feed the paper taken out to the aligning roller pair 65 through the conveying path 74. Further, a director gate 76 to selectively distribute the copy paper P to the exit port 61 or the reversing path 72 is provided at the branching portion of the conveying path 58 and the reversing path 72.

When performing the dual copying, the copy paper P passed through the fixing device 60 is led to the reversing path 72 by the director gate 76 and temporarily stacked in the temporary stacker 71 in the reversed state. After stacked in the temporary stacker 71, the copy paper P is conveyed to the aligning roller pair 65 by way of the conveying path 74 by the pick-up roller 73 and the paper feed roller pair 75. Then, after aligned by the aligning roller pair 65, the copy paper P is conveyed again to the transferring portion and a toner image is transferred on the back of the copy paper P. Thereafter, the copy paper P is discharged to the finisher 150 through the conveying path 58, the fixing device 60 and an exit roller 69.

The finisher 150 is to staple and store an exit single copy document in a unit of one copy. Whenever one copy of copy paper P to be stapled is discharged from the exit port 61, it is moved to the side to be stapled and aligned by a guide bar 151. When all copies are discharged, the discharged single unit copy paper P is pressed down by a paper presser arm 152 and stapled by a stapler unit (not shown). Thereafter, the guide bar moves down, the stapled copy paper P is discharged in a finisher receiving tray 154 in the unit of single copy by a finisher exit roller 155. The amount of the finisher receiving tray 154 to move down is determined by the number of sheets of copy paper P to some extent and it moves down stepwise whenever one copy is discharged. Further, the guide bar 151 to align the discharged copy paper P is at a height where it does not touch already stapled copy paper P placed on the finisher receiving tray 154.

The finisher receiving tray 154 is connected to a shift mechanism (not shown) which shifts (for instance, in four directions of forward, backward, leftward and rightward) for every copy in the sort mode.

At the upper part of the front panel of the main body 10, there is provided a control panel 100 to display various copying conditions and input a copying starting signal for starting the copying operation. On the control panel 100, a display 100a such as a liquid crystal display is provided.

Figure 2:
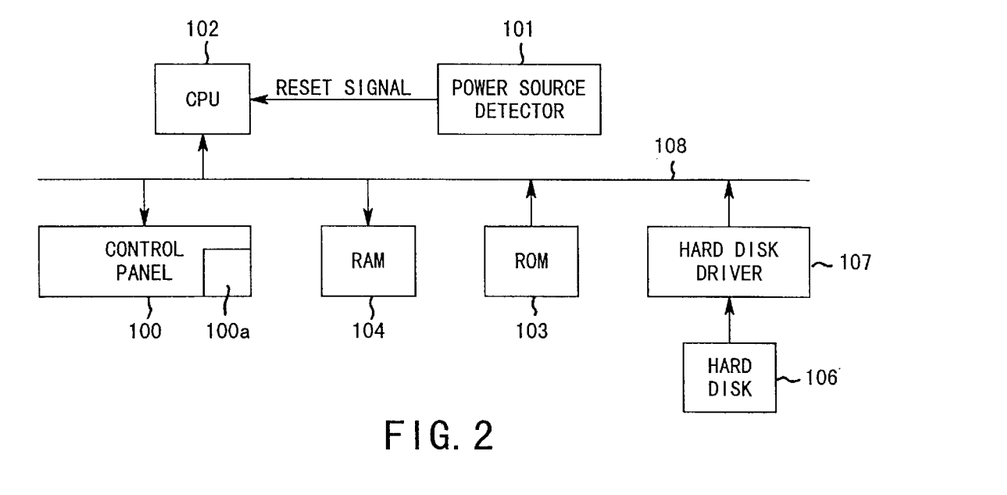
FIG. 2 is a block diagram showing a control system of the digital plain paper copier shown in FIG. 1.

FIG. 2 is a structure of a control system of a digital copier. The digital copier is composed of the control panel 100, a power source detector 101, the CPU 102 that controls the entirety of the copier a ROM to store a compressed program, a RAM 104 to store various data, a hard disk 106, hard disk driver. (HDD driver) 107 that drives the hard disk 106 and a bus 108 for connecting these devices.

In a digital copier in the above-mentioned structure, when the power source is turned ON, a reset signal is input to the CPU 102 from the power source detector 101. The CPU 102 starts the execution of a boot program stated in the boot address on the ROM 103.

Figure 3:
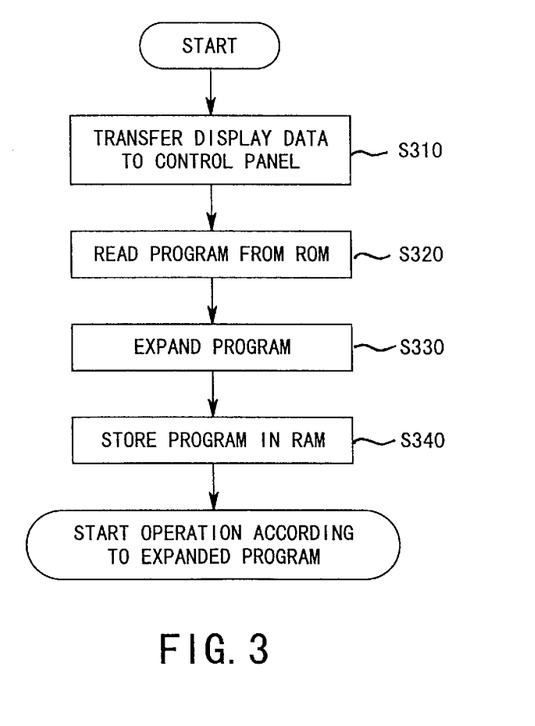
FIG. 3 is a flowchart for explaining the processing operation relative to a first embodiment of the present invention.

Next, the processing operation in the structure mentioned above from the power ON in the first embodiment of the present invention will be described referring to a flowchart shown in FIG. 3. Further, although the details are described later, initial display data to be displayed on the control panel 100 are pre-stored in the ROM 103 in this embodiment. The initial display data in the above case may be compressed or stored as they are.

When the power is ON a reset signal is received from the power source detector 101, the CPU 102 first reads display data from the ROM 103 and transfers the data to the control panel 100 and displays the initial data on the display 100a of the control panel 100 (S310). Thereafter, the CPU 102 reads a compressed program from the ROM 103 (S320). After expanding the read program, from the CPU 102 stores the expanded program in the RAM 104 (S330). When all the programs are expanded and stored in the RAM 104 (S340), the CPU 102 starts the operation of the expanded program on the RAM 104.

Figure 4:
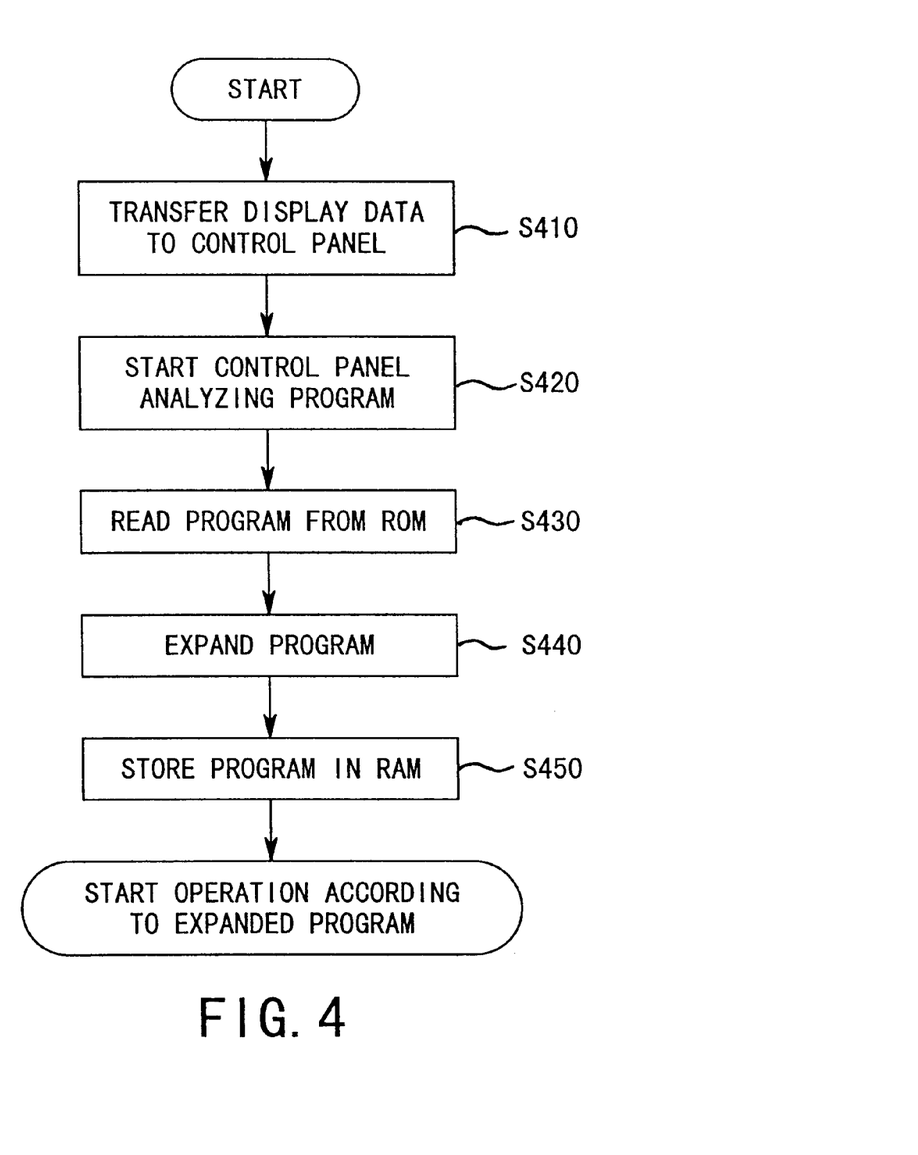
FIG. 4 is a flowchart for explaining the processing operation relative to a second embodiment of the present invention.

Next, the processing operation from the power ON in the second embodiment will be described referring to the flow-chart shown in FIG. 4. Further, in this embodiment, the initial data to the display 100a of the control panel 100 are also pre-stored in the ROM 103.

When the power source is ON and a reset signal is received from the power source detector 101, the CPU 102 first reads display data from the ROM 103 and transfers the data to the control panel 100 and initially display the data on the control panel (S410) In succession, the CPU 102 expands a minimum program only such as a program for analyzing keys on the control panel 100 without expanding programs immediately and starts to execute the analyzing program (S420).

Thereafter, the CPU 102 reads a compressed program from the ROM 103 (S430) and after expanding the read program (S440), stores the expanded program in the RAM 104 (S450) and starts to execute the expanded program on the RAM 104.

Figure 5:
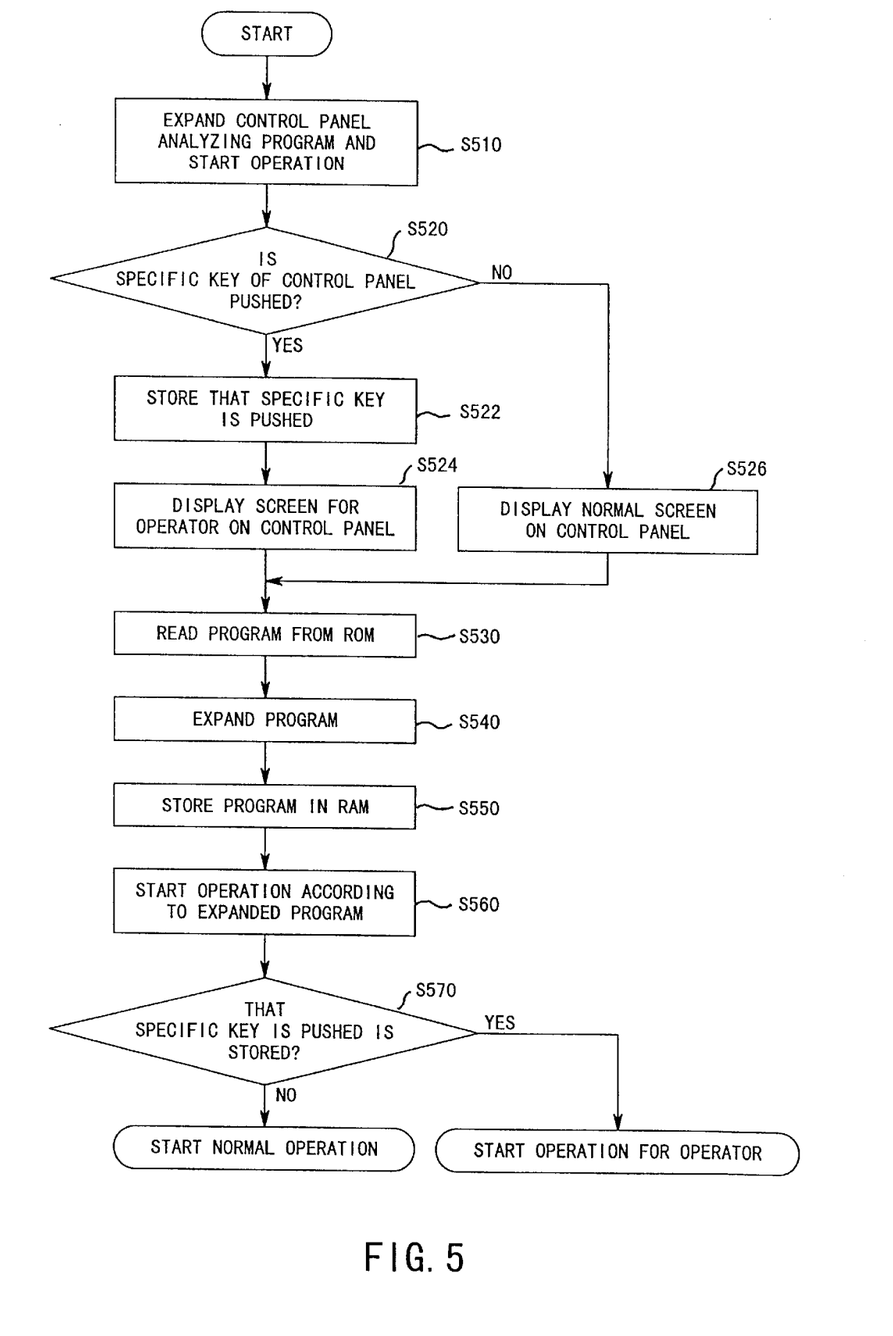
FIG. 5 is a flowchart for explaining the processing operation relative to a third embodiment of the present invention.

Next, the processing operation from the power ON in the third embodiment will be described referring to the flowchart shown in FIG. 5.

When the power is ON and a reset signal is received from the power source detector 101, the CPU 102 expand only a program to analyze keys of the control panel from the ROM 103 and starts to execute the expanded program (S510). The CPU 102 checks whether a specific key is pushed on the control panel 100 based on the above-mentioned program (S520).

Figure 6:
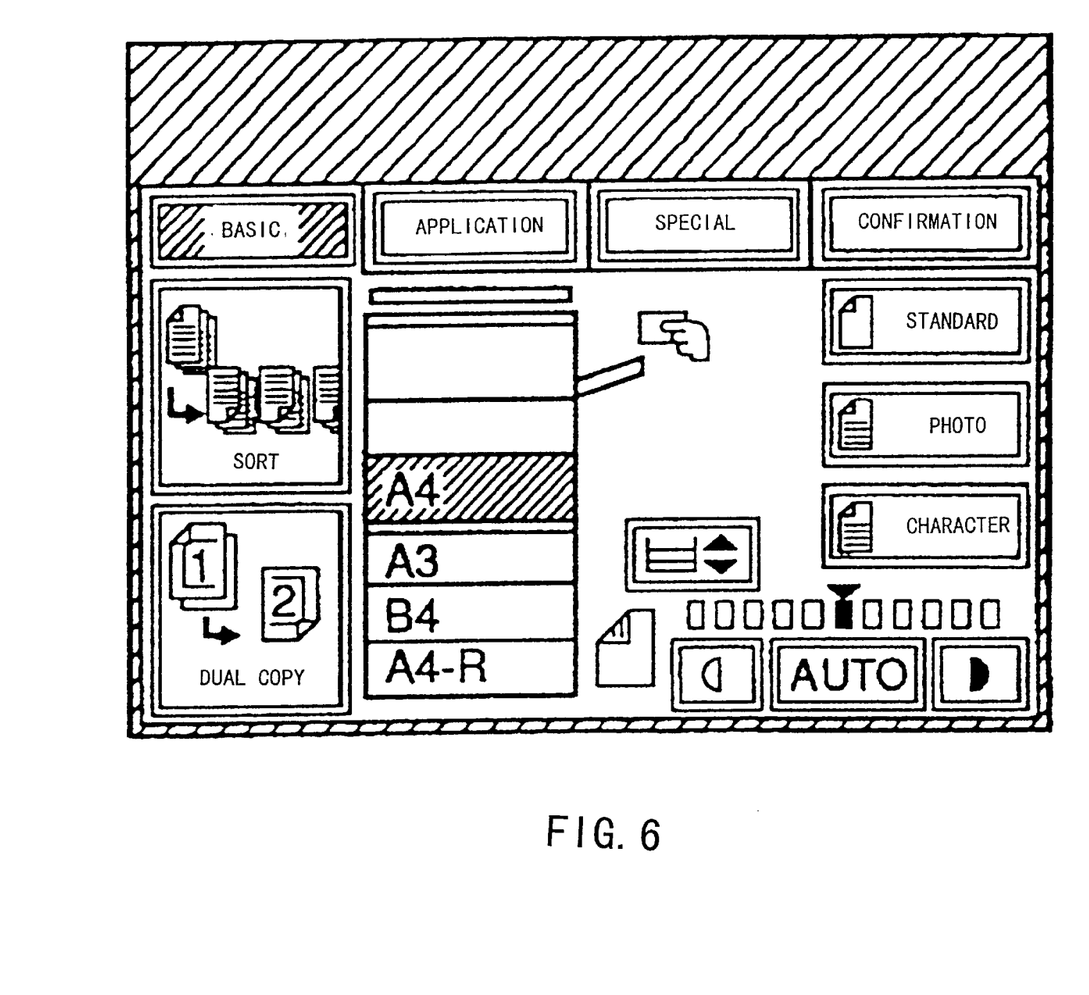
FIG. 6 is a diagram showing an example of the norm indication shown on the display provided on the control panel.

Here, when no specific key was pushed, the CPU 102 displays a normal screen shown in FIG. 6 on the displays 100a of the control panel 100 (S526). Further, when a specific key was pushed, the CPU 102 stores that a specific key was pushed (S522) and displays the screen for operator shown in FIG. 7 on the display 100a of the control panel (S524).

After displaying the normal screen or the screen for operator on the display 100a of the control panel as mentioned above, the CPU 102 reads a compressed program from the ROM 103 (S530), expands the read program (S540), stores the expanded program in the RAM 104 (S550) and starts the execution of the expanded program on the RAM 104 (S560).

In succession, the CPU 102 checks whether the specific key that was pushed is stored (S570) and if it was stored, starts to execute the adjusting program for operator and if not, starts to execute a normal program.

Further, in this embodiment it is not necessary for user to continuously keep a key pushed as the key analyzing program of the control panel 100 is started before expanding programs.

Figure 8:
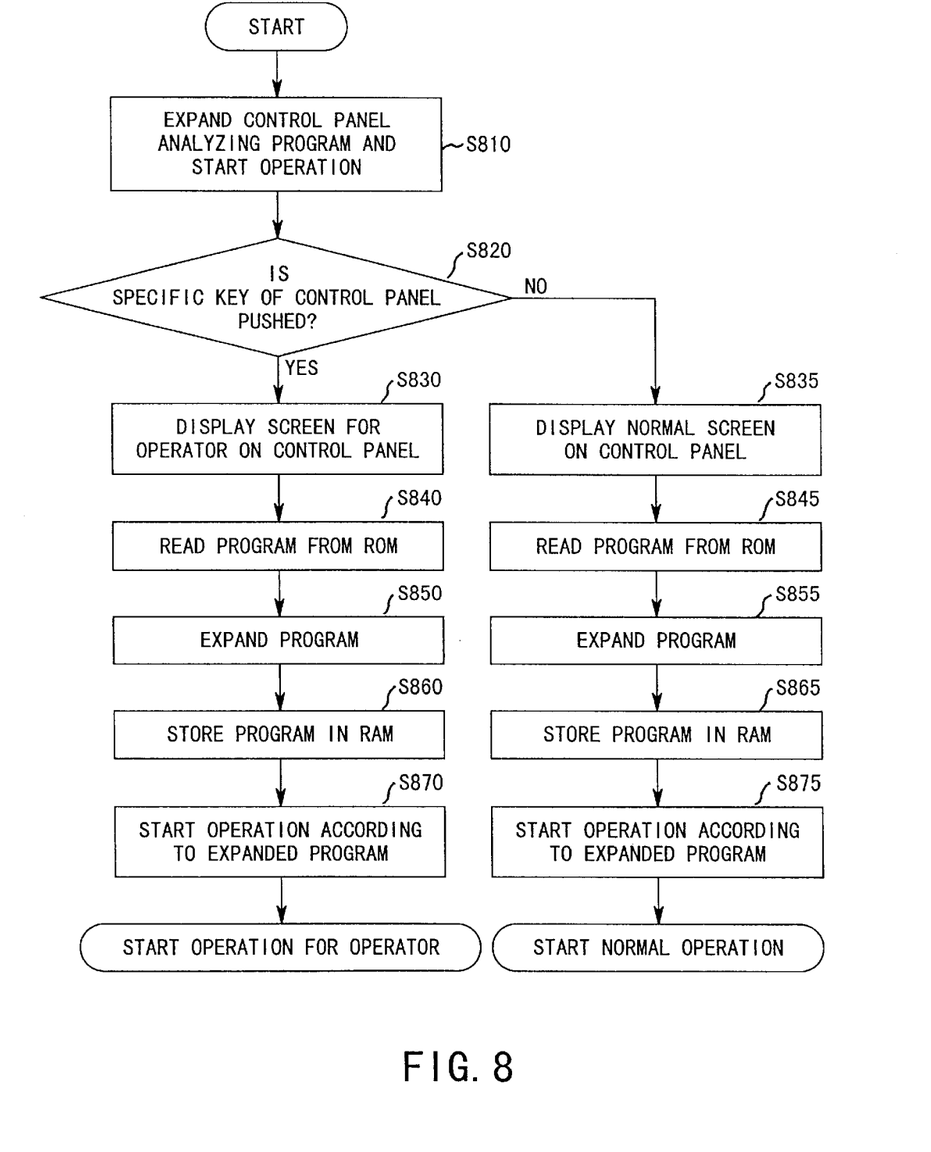
FIG. 8 is a flowchart for explaining the processing operation relative to a fourth embodiment of the present invention.

Next, the processing operation from the power ON in the fourth embodiment will be described referring to the flowchart shown in FIG. 8.

When the power is ON and a reset signal is received from the power source detector 101, the CPU 102 expands only a program to analyze keys of the control panel 100 from the ROM 103 and starts to execute the program (S810). The CPU 102 checks if a specific key is pushed on the control panel based on the above-mentioned program (S820).

Figure 7:
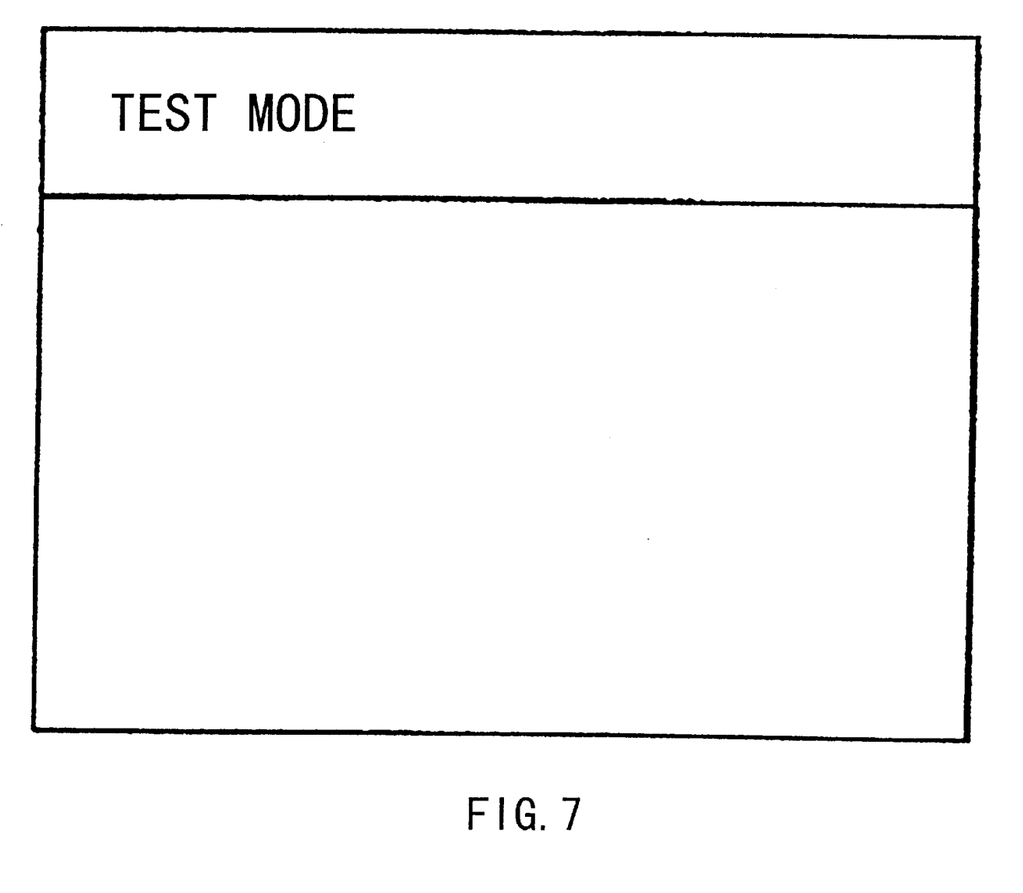
FIG. 7 is a diagram showing an example of the indication for operator shown on the display provided on the control panel.

Here, when a specific key was pushed, the CPU 102 displays the screen for operator shown in FIG. 7 on the display 100a of the control panel 100 (S830) and then, reads a compressed program from the ROM 103(S840), expands the read program (S850), stores the expanded program in the RAM 104 (S860), starts the execution of the expanded program on the RAM 104 (S870) and starts the operation for operator.

Further, if a specific key was not pushed, the CPU 102 displays the normal screen shown in FIG. 6 on the displays 100a of the control panel 100 (S835), reads a compressed program from the ROM 103 (S845), expands the read program (S855), stores the expanded program in the RAM 104 (S865) and starts the normal operation by starting the execution of the expanded program on the RAM 104 (S875).

Further, although it was explained in the above embodiment that the compressed program is stored in the ROM 103, the program may be stored in the HDD 106 instead of the ROM 103. In the above case, the compressed program is expanded and stored in the RAM 104 from the HDD 106 via the, HDD driver 107.

As described in the above, according to the embodiments, the display is made on the control panel before a program is expanded, user is able to recognize immediately that the power source is properly turned ON.

Further, as the control panel key analyzing program is started before the program expansion, user is not required to continuously push a key.

As mentioned above in detail, according to the present invention, it is possible to provide an image forming apparatus capable of quickly making the display on the control panel and not requiring to push a specific key continuously when a program is compressed and stored in a ROM and the power is ON.

What is claimed is:

1. An image forming apparatus configured to form an image by reading an image on a document, comprising:
    a control panel having a display configured to receive an input data;
    a memory configured to store an initial display data of the control panel and a compressed program;
    a power source detector configured to detect that a power source is turned ON; and
    a processing unit configured to make an initial display on the display of the control panel by reading initial display data of the control panel stored in the memory when the power ON is detected by the detector,
    wherein the memory is further configured to store a plurality of compressed programs, and wherein the processing unit is further configured to:
        read and expand only a minimum required compressed program out of the compressed programs stored in the memory;
        read and expand any remaining compressed programs stored in the memory; and
        execute the expanded remaining programs when the minimum required program has been executed.

2. An image forming apparatus configured to read an image on a document and form an image, comprising:
    a control panel having a display configured to be operated by an operator;
    a memory configured to store compressed programs including an analyzing program of the control panel;
    a power source detector configured to detect that a power is ON;
    a processing unit configured to:
        read and expand the analyzing program of the control panel and execute the expanded analyzing program to judge whether the control panel is operated by the operator,
        display an operator mode screen on the display of the control panel when the expanded analyzing program judges the operator operated the control panel, and
        read and expand a remaining program stored in the memory after the display of the control panel displays the operator mode screen and execute the operator mode based on the expanded remaining program.

3. An image forming apparatus as set forth in claim 2, wherein the processing unit is further configured to:
    display a normal mode screen on the display of the control panel when the expanded analyzing program judges the operator has not operated the control panel; and execute the normal mode based on the expanded remaining program.

4. A program execution method in an image forming apparatus including a control panel having a display, the method comprising:

receiving an input data at the control panel;

storing initial display data of the control panel and a compressed program in a memory;

detecting that a power source of the apparatus is turned ON;

making an initial display on the display by reading the initial display data stored in the memory when the power ON is detected in the detecting step;

storing a plurality of compressed programs in the memory;

reading and expanding only a minimum required compressed program out of the compressed programs stored in the memory;

executing the expanded minimum required program when the display of the control panel displays the initial display;

reading and expanding any remaining compressed programs stored in the memory; and executing the expanded remaining programs when the expanded minimum required program has been executed.

5. A program execution method in an image forming apparatus including a control panel having a display, the method comprising:

storing compressed programs including an analyzing program of the control panel;

detecting that a power source of the apparatus is ON;

reading and expanding the analyzing program of the control panel;

executing the expanded analyzing program to judge whether the control panel is operated by an operator;

display an operator mode screen on the display of the control panel when the expanded analyzing program judges the operator has operated the control panel;

reading and expanding a remaining program stored in the memory after displaying the operator mode screen; and executing the operator mode based on the expanded remaining program.

* * * * *